Nov. 10, 1970    A. H. YOUMANS ET AL    3,539,911
INDUCTION WELL LOGGING APPARATUS HAVING INVESTIGATIVE
FIELD OF ASYMMETRIC SENSITIVITY
Filed June 21, 1968    5 Sheets-Sheet 1
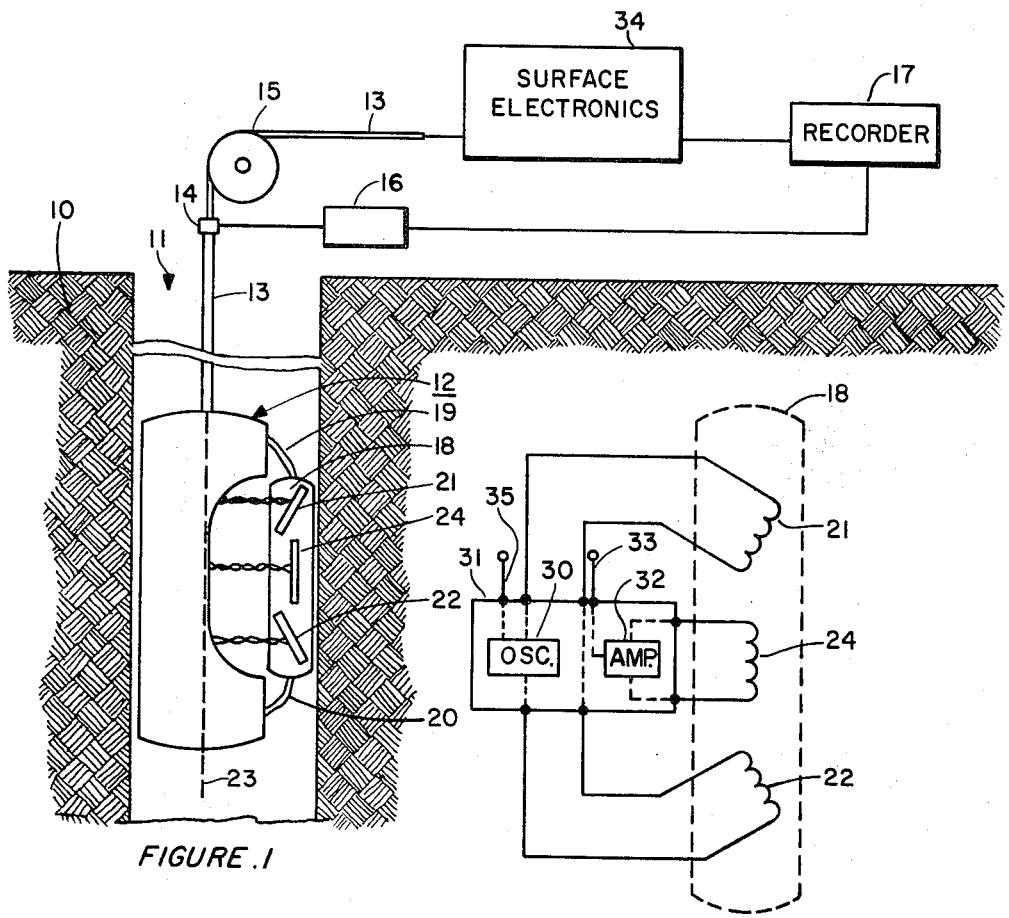
FIGURE .1
FIGURE .2
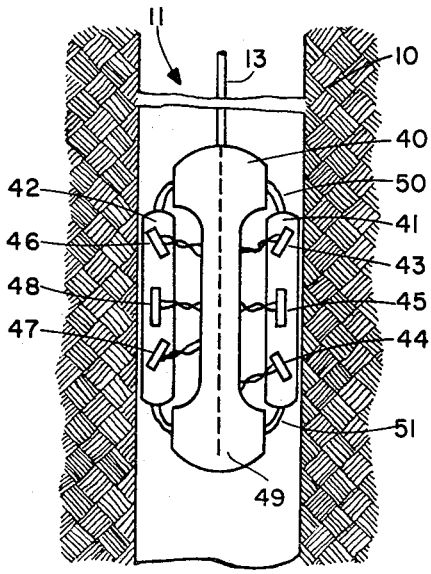
FIGURE .3
ARTHUR H. YOUMANS
ERIC C. HOPKINSON
INVENTORS
BY William E. Johnson Jr.
ATTORNEY Nov. 10, 1970     A. H. YOUMANS ET AL     3,539,911
INDUCTION WELL LOGGING APPARATUS HAVING INVESTIGATIVE
FIELD OF ASYMMETRIC SENSITIVITY Filed June 21, 1968     5 Sheets-Sheet 2

ARTHUR H. YOUMANS
ERIC C. HOPKINSON
INVENTORS

BY William E. Johnson Jr.
ATTORNEY

United States Patent Office 3,539,911
Patented Nov. 10, 1970

3,539,911
INDUCTION WELL LOGGING APPARATUS HAVING INVESTIGATIVE FIELD OF ASYMMETRIC SENSITIVITY
Arthur H. Youmans and Eric C. Hopkinson, Houston, Tex., assignors to Dresser Industries, Inc., Dallas, Tex., a corporation of Delaware
Filed June 21, 1968, Ser. No. 738,941
Int. Cl. G01v 3/10
U.S. Cl. 324—6                                  7 Claims

ABSTRACT OF THE DISCLOSURE

A pad-type of induction well logging instrument having one or more pads is adapted to traverse an earth borehole. In one embodiment, the pads each have a pair of transmitter coils wound in series opposition wherein each of the transmitter coils is positioned at an acute angle relative to the longitudinal axis of the instrument. A receiver coil positioned parallel to the longitudinal axis of the instrument is provided for each pair of transmitter coils. In an alternative embodiment, one of the pads has the transmitter and receiver coils rotated through a predetermined angle compared to the angles and positions set forth in the first embodiment.

This invention relates to an apparatus for investigating earth formations traversed by a borehole and more particularly to induction well logging systems.

In conventional logging systems using induction principles, an instrument having one or more transmitter coils energized by alternating current and one or more receiver coils is lowered into an earth borehole and indications are obtained relating to the influence of the surrounding formations on the electromagnetic field established in the receiver coils. Usually such indications are obtained by observing the voltage induced in the receiver coil or coils. While there have been many improvements in the field of induction well logging, including the positioning of the alternating current oscillator within the borehole instrument to alleviate the problem of transmitting the oscillations from the surface down to the instrument, as well as improvements such as the multi-coil systems disclosed in U.S. Pat. No. 2,582,314 to Henri-Georges Doll, issued on Jan. 15, 1952, such systems of the prior art suffer from one or more of a number of fundamental difficulties, viz., imperfect interface and thin bed response; sensitivity to borehole diameter and fluid conductivity; and dependence on the position of the borehole instrument.

It is therefore the primary object of the present invention to provide an induction well logging apparatus having an improved thin bed and interface response;

It is another object of the present invention to provide an induction well logging apparatus having a reduced sensitivity to borehole fluid; and It is still another object of the present invention to provide an induction well logging apparatus which is not affected adversely by variations in the position of the instrument in the borehole.

Figure 4:
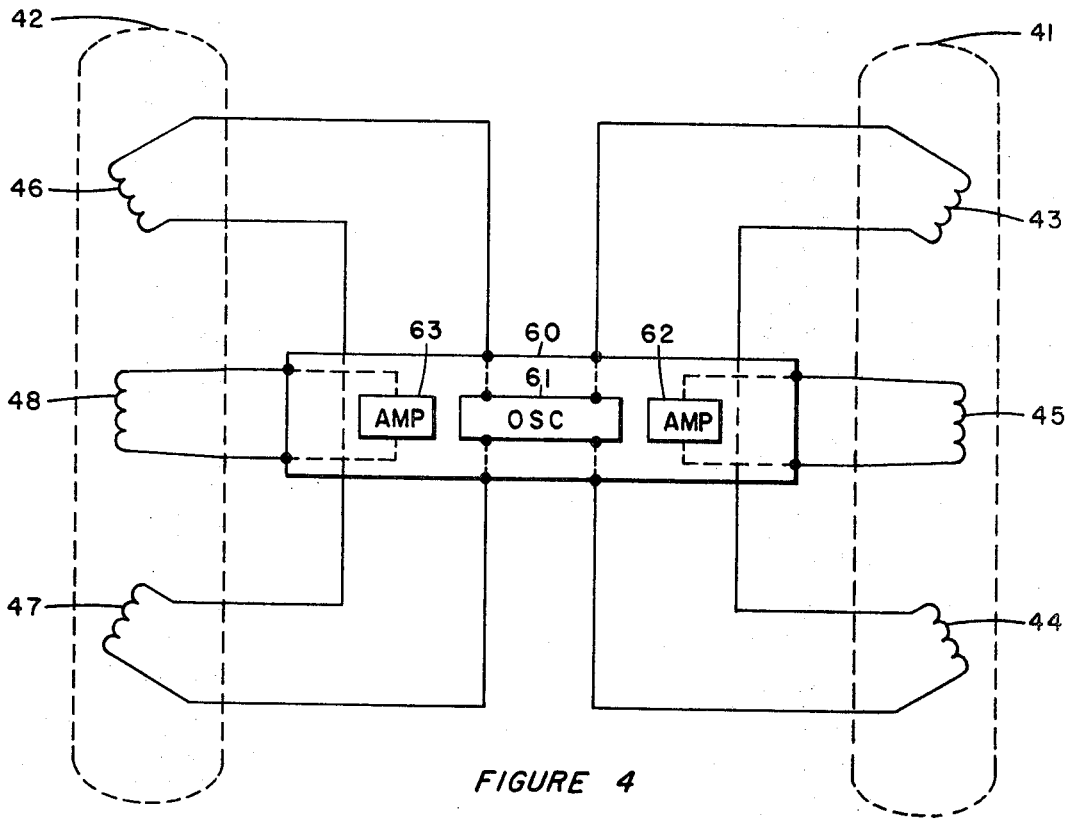
Figure 5:
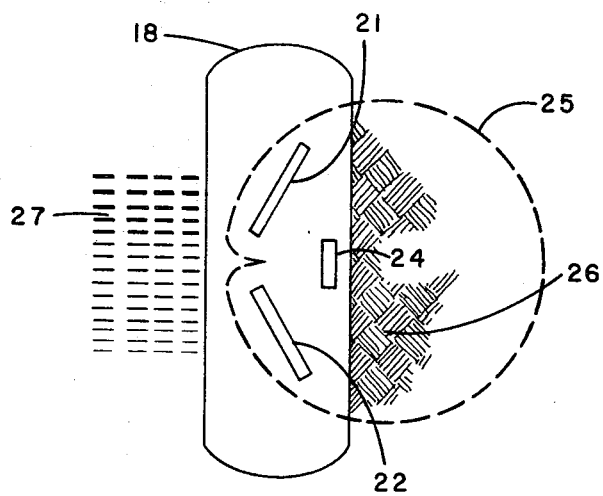
Figure 6:
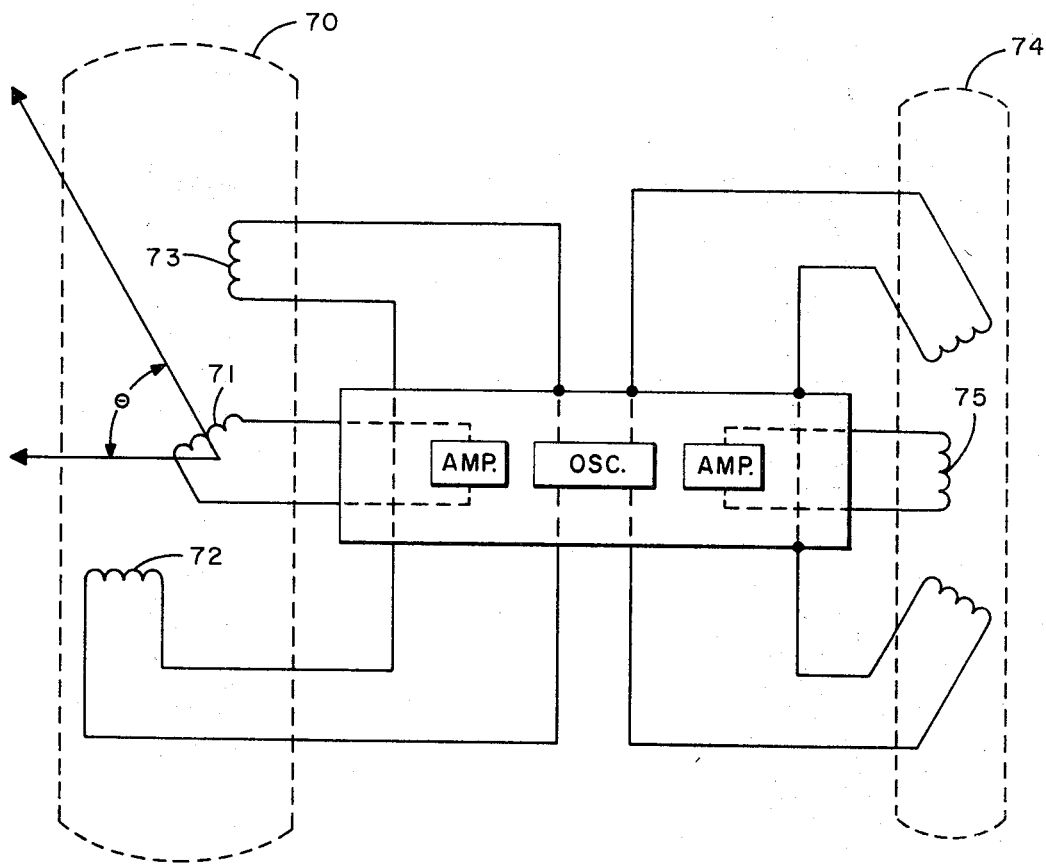
Figure 7:
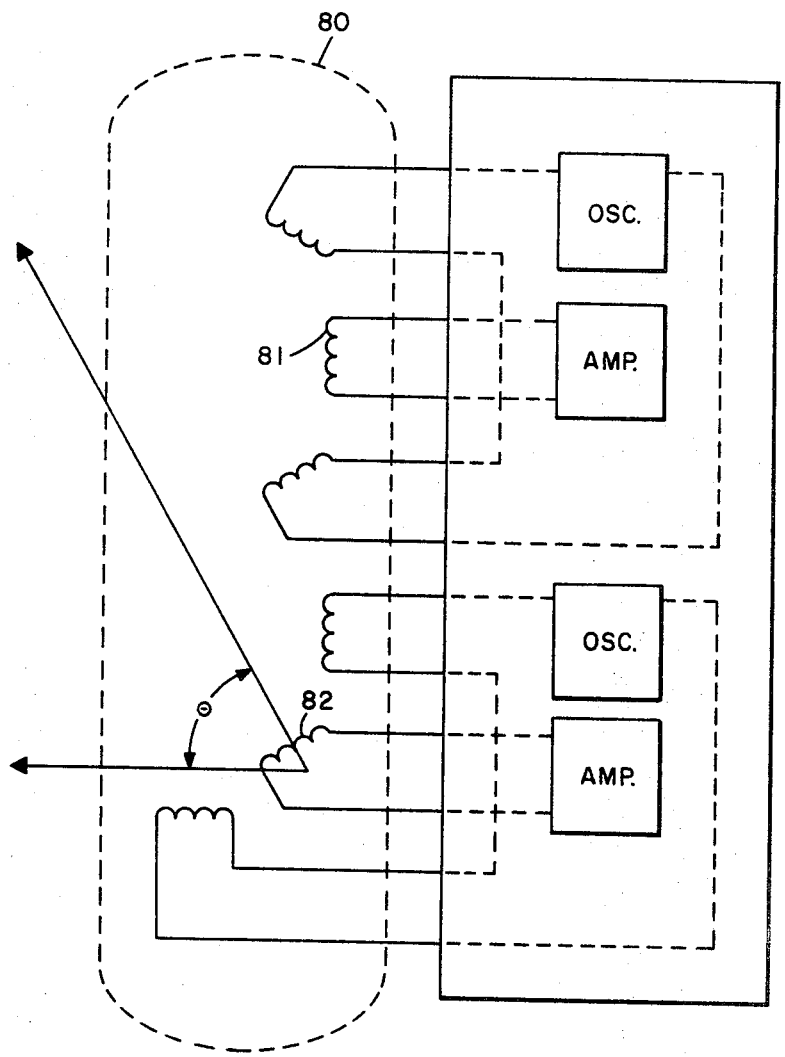
Figure 8:
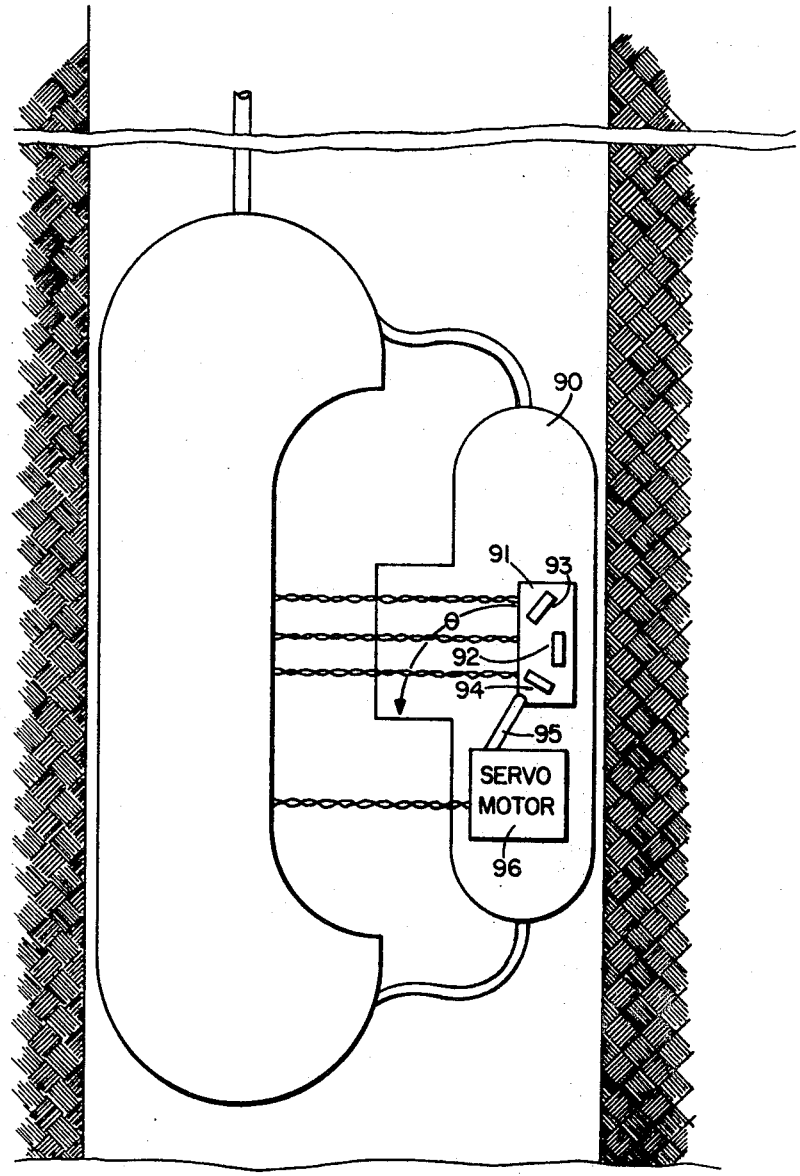

The objects of the invention are accomplished, broadly, by an induction well logging apparatus having at least one pad in contact with the wall of the borehole, the pad having an induction coil configuration which provides an investigative field of asymmetric sensitivity. Such a configuration includes the angling of the transmitter coils away from the longitudinal axis of the elongated borehole instrument and a parallel positioning of the receiver coil with respect to that same longitudinal axis. These and other objects, features and advantages of the present invention will become more apparent from a reading of the folowing detailed description and drawing, in which:

FIG. 1 schematically illustrates a segment of an earth borehole and the surrounding formations, partially in cross section, and a borehole instrument and associated surface equipment according to the invention;

FIG. 2 schematically illustrates the induction coil geometry and the associated borehole instrument electronics for the borehole instrument of FIG. 1 according to the invention;

FIG. 3 schematically illustrates an alternative embodiment of the borehole instrument according to the invention;

FIG. 4 schematically illustrates the induction coil geometry and the associated borehole instrument electronics for the borehole instrument of FIG. 3 according to the invention;

FIG. 5 schematically illustrates the investigative field of asymmetric sensitivity which results from the coil configurations according to the invention;

FIG. 6 schematically illustrates the induction coil geometry and the associated borehole electronics for the borehole instrument according to an alternative embodiment of the invention;

FIG. 7 schematically illustrates still another embodiment of the borehole instrument according to the invention; and FIG. 8 illustrates still another embodiment of the borehole instrument according to the invention.

Referring now to the drawing in more detail, and especially to FIG. 1, there is illustrated a portion of the earth's surface 10 traversed by a well or borehole 11. An induction logging apparatus 12 is suspended in the borehole 11 on a cable 13 extending to the surface of the earth. The borehole 11 may contain a liquid which may be more or less conductive than the surrounding formations, although in some wells no liquid is present. The cable 13 passes over a measuring sheave 14 and is wound onto or payed out from a drum 15 at the earth's surface. A transmission 16 driven by the measuring sheave 14 is connected to the conventional recorder 17, for example, an x-y plotter, to provide a means for recording the characteristics of the earth formations as a function of depth in the borehole.

The apparatus 12 has a pad 18 pressed into contact with the borehole wall by a pair of spring members 19 and 20. A pair of transmitter coils 21 and 22 wound in series opposition are provided in the pad 18, and as explained more fully with regard to FIG. 2, are mounted within the pad at an acute angle from the longitudinal axis 23 of the elongated instrument 12. A receiver coil 24 is positioned in the pad 18 substantially parallel to the axis 23. The transmitter coils and the receiver coil are connected by the necessary conductors to the main instrument housing 12. However, those skilled in the art will recognize that all or a portion of the electronics illustrated in FIG. 2 could be positioned within the pad itself if desired.

FIG. 2 illustrates schematically the coil configuration located in the pad assembly 18, the pad 18 being denoted by the broken line. The receiver coil 24, being positioned substantially parallel to the longitudinal axis of the instrument 12, is located between the two transmitter coils 21 and 22. The transmitter coils 21 and 22 are angled from the longitudinal axis 23 by an acute angle chosen to provide an optimum investigative field of asymmetric sensitivity. Although the optimum angle for each of the transmitter coils has been determined to be approximately 45°, the optimum range of the angle has been found to be from about 30° to about 60° from the axis 23. Thus, when the angle of 45° is used for each of the two transmitter coils, the coils 21 and 22 bear a 90° relation to each other. With such a coil configuration in a pad 18, it has been found that the induction log produced thereby is substantially insensitive to both borehole diameter and borehole fluid conductivity. FIG. 5 illustrates in a representative manner how such a coil configuration provides for asymmetrical sensitivity, the field of investigation being denoted generally by the broken line 25. Since the area encompassed by the line 25 extends into the formation 26, but not into the borehole liquid 27, it should be appreciated that such a system is substantially independent of the conductivity of the borehole liquid. Furthermore, since the pad 18 is held in contact with the borehole wall, the field of investigation is substantially independent of borehole diameter, assuming of course that the instrument 12 and pad 18 are of a size to be placed within the borehole 11 in the first instance.

A miniature coil system, perhaps using small or short coils, while lacking in depth of investigation as compared to larger coil systems, produces the best thin bed and sharp interface response by virtue of the miniature nature of the coils. However, such systems have not been generally successful because of interference caused by borehole liquid conductivity and because of sensitivity to borehole diameter. Thus, by providing an induction logging apparatus which is substantially insensitive to borehole diameter and insensitive to the conductivity of the borehole fluid, those skilled in the art will recognize that smaller coils can be used and thus provide a system which features an improved response to thin beds and sharp interfaces.

A specific utilization of the induction logging apparatus herein described resides in the measurement of strata orientaiton, commonly referred to as dip logging. Dip logging instruments are ordinarily provided with three or more pads having identical sensing means which continuously measure formation characteristics along the respective lines of traverse of the pads. Such measurements provide indications of the extent to which the various strata are inclined relative to the borehole. Auxiliary apparatus within the instrument serves to indicate the direction and degree of inclination of the borehole relative to magnetic north. By trigonometric computations the orientations in space of the strata bedding planes is then ascertained. However, prior art dip logging apparatus have been seriously limited by the lack of resolution of the sensing means used in the pads. Since the precision of the formation dip determination is directly related to the precision in which anomolies such as strata interfaces are measured, the present invention is particularly suited for providing improved dip logging measurements. The coil configuration according to the invention is such that it is particularly sensitive to formation conductivity very near the plane of the receiver coil, thus responding to variations which occur within small depth increments, thereby producing a high resolution measurement. Moreover, the induction measurement for dip logging has the advantage that the pad need not necessarily contact the rock surface in order to sense the rock characteristics. Conversely, conventional dip log devices employ measuring electrodes which do not perform satisfactorily unless they are substantially in contact with the measured surface.

Also illustrated in FIG. 2 are conventional electronic circuits for use with the coil configuration according to the invention. An oscillator section 30 is mounted in the box 31 located within the main instrument housing 12, the oscillator 30 providing an alternating current to the transmitter coils 21 and 22. Also included in the box 31 is an amplifier 32 for amplifying the signals detected by the receiver coil 24. The output of the amplifier is connected by the conductor 33 to the cable 13 for transmission of the signals to the earth's surface and to the surface electronics section 34. A conductor 35 from the cable 13 is connected to oscillator 30 to provide a means for triggering the oscillator from the earth's surface if desired. It should also be appreciated that cable 13 carries the necessary A.C. and D.C. power for the electronics found within the borehole instrument 12.

FIG. 3 illustrates an alternative embodiment of the borehole instrument 40 adapted to traverse an earth borehole 11 in the earth's surface 10, the instrument 40 being suspended on a cable 13 as is the instrument 12 of FIG. 1. The instrument 40 has a pair of pad members 41 and 42 which are constructed similarly to pad 18 which is also illustrated in FIG. 1. The pad 41, being pressed against the borehole wall on one side of the instrument 40, by the spring members 50 and 51, has a pair of transmitter coils 43 and 44 positioned at an acute angle from the axis 49, and a receiver coil 45 substantially parallel to that axis. Likewise, the pad 42 is pressed against the borehole wall on the opposite side of the instrument 40, and has a pair of similarly angled transmitters 46 and 47 and a receiver coil 48 which is substantially parallel to the axis 49 of the instrument 40. Thus, the apparatus 40 provides a system having a plurality of investigative field of asymmetric sensitivity which are substantially independent of the borehole diameter and of the conductivity of the borehole fluid. It should be appreciated that while FIG. 3 illustrates an induction logging apparatus having a pair of pads on opposite sides of the in strument (and hence on the opposite sides of the borehole), those skilled in the art will recognize that any number of pads could be used in conjunction with the main instrument housing 40, and that a continuous pad, i.e., one which completely encircled the instrument 40 and 360° of the borehole wall, can be used if so desired. Likewise, as another example, three or more such pads provide a means for conducting the dip logging measurements heretofore discussed.

FIG. 4 illustrates graphically the coil configuration embodied within the pads 41 and 42 of FIG. 3. It should be appreciated that similar geometric considerations are applicable for the location of the coils with respect to the longitudinal axis of the housing 40 as are discussed above with respect to the single pad 18. There is also illustrated in FIG. 4 a box 60 located in the main housing 40 having an oscillator section 61 for driving the transmitter coils of the two pads 41 and 42. The box 60 also has a pair of amplifiers 62 and 63 which are respectively responsive to the receiver coils 45 and 48. The outputs (not illustrated) of the amplifiers 62 and 63 are connected to the cable 13 for transmission of the amplified signals to the earth's surface.

The oscillator 30 of FIG. 2 and oscillator 61 of FIG. 4 have been operated quite satisfactorily at about 20 kc. Also, the receiving circuitry has been operated with circuitry which operates upon the principle of the detected signal being in phase with the transmitter current. However, those skilled in the art will recognize that other frequencies can be used quite satisfactorily and that other similarly satisfactory modes of investigation result from using out-of-phase detection circuitry.

Likewise, those skilled in the art will recognize that the axial distance between the axes of the transmitter and receiver coils will influence the investigative mode, and that by adjusting that distance, mutual balance of the coil configuration can be attained. For example, the geometries, frequencies and circuit configurations disclosed herein have produced investigative fields which are eight times more sensitive to conductive material in front of the receiver than in back of the receiver, thus effectively eliminating the conductivity of borehole fluid as a factor in induction logging.

FIG. 6 illustrates schematically the geometry of a coil configuration in an alternative embodiment according to the invention. In the embodiments discussed above, the receiver coil is shown with its axis substantially parallel to the borehole axis, coinciding with the longitudinal axis of the borehole instrument. With such a coil configuration, the instrument is preferentially sensitive to induced currents flowing in the formations in a plane perpendicular to the axis of the borehole. However, due to the small size of the coil array which is made possible by the configuration itself, it is practical to rotate the entire coil assembly about a horizontal axis in the plane of the receiver coil and through the longitudinal axis of the instrument. FIG. 6 illustrates such a rotation of the coil assembly in the pad 70 through an angle θ. Thus, the receiver coil 71 and the transmitter coils 72 and 73 are all rotated through the angle θ, as compared to the pad 74 with its receiver coil and transmitter coils arranged similarly to one of the pad and coil configurations illustrated in FIG. 4. Thus, the overall geometry illustrated in FIG. 6 indicates that the receiver coil 75 is positioned parallel to the longitudinal axis of the instrument housing, whereas the receiver coil 71 and associated transmitter coils are rotated through an angle θ. For ease of illustration, the angle θ is shown as being approximately 45°. Whatever the angle θ, the system in pad 70 becomes preferentially sensitive to formation conductivity in the new plane of the receiver coil 71. Since many stratified rocks have a different conductivity parallel to the bedding planes than perpendicular to the bedding planes, the two pads being preferentially sensitive to different planes provides a means for detecting and measuring anisotropy of this type. Since the coil array is so small, the angle can be made 90°, if desired, to create a true perpendicular relationship between the measurements made by the two pads.

FIG. 7 illustrates an alternative embodiment of the invention, but which operates in principle like the ebbodiment illustrated in FIG. 6. Instead of having two pads, the two coil arrays are located in the same pad 80. Thus, the top array with its receiver coil 81 parallel to the instrument, and the lower array with its receiver coil 82 rotated through an angle θ provide a means for detecting and measuring the anisotropy from a single pad.

FIG. 8 illustrates an alternative embodiment of the borehole instrument according to the invention wherein the pad member 90 has a rotatable coil assembly 91 having a receiver coil 92 and a pair of transmitter coils 93 and 94. The assembly 91, being constructed of a material which does not affect the magnetic fields, for example, foam urethane, is connected through the shaft 95 to a conventional servo stepping motor 96 controllable from the earth's surface to rotate the coil assembly through the angle θ or any increments thereof. The necessary lines 97 for controlling the servo motor 96 are connected through the cable 13 to the earth's surface.

In the operation of the system illustrated in FIG. 8, measurements are made at one position of the coil assembly and then at another. The measurements can then be compared. For example, the angles at which maximum and minimum conductivity are observed permit inferences as to the dip of the measured strata relative to a plane containing the borehole axis and the axis of rotation of the coil assembly.

Thus, while the preferred embodiments of the invention have been illustrated and described in detail, modifications and alternations of these embodiments will occur to those skilled in the art which nonetheless are within the true scope of this invention. It is therefore intended that such modifications and alterations as do fall within the scope of the invention be covered by the appended claims. For example, in the embodiment illustrated in FIG. 7, the rotated array could be located at the top of the pad and the non-rotated array at the bottom. Likewise, in that same embodiment, the oscillator sections could be alternately activated to eliminate interference betwen the two arrays.

The embodiments of the invention in which an exclusive property or privilege is claimed are defined as follows:

1. An induction well logging apparatus for investigating the characteristics of earth formations surrounding a borehole, comprising:
   an elongated borehole instrument adapted for traversing an earth borehole;
   a pad member mounted on said instrument having means for causing said pad member to contact the borehole wall;
   at least two alternating current energized coils wound in series opposition mounted in said pad member, each of said coils being mounted at an acute angle from the longitudinal axis of said instrument; and
   a receiving coil mounted in said pad member responsive to electromagnetic radiation in said formations resulting from said energized coils, said receiving coil being mounted parallel to said longitudinal axis and between said energized coils.

2. The apparatus according to claim 1 wherein said acute angle is in the range betwen 30° and 60°.

3. The apparatus according to claim 1 wherein said acute angle is about 45°.

4. The apparatus according to claim 2 comprising in addition thereto:
   a second pad member mounted on said instrument said second pad member being removed from said first pad member by an angle up to 180° around the periphery of said borehole instrument and having means for causing said second pad member to contact the borehole wall;
   at least two alternating current energized coils wound in series opposition mounted in said second pad member; and
   a second receiving coil mounted in said second pad member responsive to electromagnetic radiation in said formations resulting from said energized coils in said second pad member, said receiving coil being mounted between said two energized coils in said second pad member and other than parallel to said longitudinal axis.

5. An induction well logging apparatus for investigating the characteristics of earth formations surrounding a borehole, comprising:
   an elongated borehole instrument adapted for traversing an earth borehole;
   a pad member mounted on said instrument having means for causing said pad member to contact the borehole wall;
   a first pair of alternating current energized coils wound in series opposition mounted in said pad member, each coil of said first pair being mounted at an acute angle from the longitudinal axis of said instrument;
   a first receiving coil mounted in said pad member between said first pair of energized coils and parallel to said longitudinal axis responsive to electromagnetic radiation in said formations resulting from said first pair of coils;
   a second pair of alternating current energized coils wound in series opposition mounted in said pad member; and
   a second receiving coil mounted in said pad member between said second pair of energized coils and nonparallel to said longitudinal axis responsive to electromagnetic radiation in said formations resulting from said second pair of coils.

6. An induction well logging apparatus for investigating the characteristics of earth formations surrounding a borehole, comprising:
   an elongated borehole instrument adapted for traversing an earth borehole;
   a pad member mounted on said instrument having means for causing said pad member to contact the borehole wall;
   a first pair of alternating current energized coils wound in series opposition mounted in said pad member, each coil of said first pair being mounted at an acute angle from the longitudinal axis of said instrument;

a first receiving coil mounted in said pad member between said first pair of energized coils and at a first angle from said longitudinal axis responsive to electromagnetic radiation in said formations resulting from said first pair of coils;

a second pair of alternating current energized coils wound in series opposition mounted in said pad member; and a second receiving coil mounted in said pad member between said second pair of energized coils and at a second angle from said longitudinal axis different from said first angle responsive to electromagnetic radiation in said formations resulting from said second pair of coils.

7. An induction well logging apparatus for investigating the characteristics of earth formations surrounding a borehole, comprising:

an elongated borehole instrument adapted for traversing an earth borehole;

a pad member mounted on said instrument having means for causing said pad member to contact the borehole wall;

a pair of alternating current energized coils wound in series opposition mounted in said pad member, each coil of said pair being mounted at an acute angle from the longitudinal axis of said pad member.

a receiving coil mounted in said pad member between said pair of energized coils and parallel to said longitudinal axis responsive to electromagnetic radiation in said formations resulting from said pair of coils; and means in said pad member for rotating said coils to vary said acute angle while said instrument is within the borehole.

References Cited

UNITED STATES PATENTS

| | | | |
|---|---|---|---|
| 2,451,596 | 10/1948 | Wheeler | 324—3 |
| 2,582,314 | 1/1952 | Doll | 324—6 |
| 2,736,967 | 3/1956 | Doll. | |
| 2,951,982 | 9/1960 | Schuster | 324—6 |
| 2,987,668 | 6/1961 | Gondouin | 324—6 |
| 2,997,645 | 8/1961 | Huddleston et al. | 324—6 |
| 3,014,177 | 12/1961 | Hungerford et al. | 324—8 |
| 3,052,837 | 9/1962 | Arbogast et al. | 324—3 |
| 3,132,298 | 5/1964 | Doll et al. | 324—1 XR |
| 3,167,707 | 1/1965 | Oliver | 324—1 |

GERARD R. STRECKER, Primary Examiner

UNITED STATES PATENT OFFICE
CERTIFICATE OF CORRECTION

Patent No. 3,539,911                    Dated November 10, 1970

Inventor(s)   Arthur H. Youmans et al.

It is certified that error appears in the above-identified patent and that said Letters Patent are hereby corrected as shown below:

Column 6, line 21, "claim 2" should read -- claim 1 --.

Signed and sealed this 25th day of May 1971.

(SEAL)
Attest:

EDWARD M. FLETCHER, JR.                 WILLIAM E. SCHUYLER, JR.
Attesting Officer                       Commissioner of Patents